United States Patent
Kurihara

(10) Patent No.: US 9,140,541 B2
(45) Date of Patent: Sep. 22, 2015

(54) IMAGE MEASURING APPARATUS AND IMAGE MEASURING METHOD

(75) Inventor: Masaki Kurihara, Yokohamashi (JP)

(73) Assignee: MITUTOYO CORPORATION, Kawasaki-shi (JP)

( * ) Notice: Subject to any disclaimer, the term of this patent is extended or adjusted under 35 U.S.C. 154(b) by 754 days.

(21) Appl. No.: 13/193,214

(22) Filed: Jul. 28, 2011

(65) Prior Publication Data

US 2012/0044343 A1    Feb. 23, 2012

(30) Foreign Application Priority Data

Aug. 19, 2010   (JP) ................. 2010-183566

(51) Int. Cl.
| | |
|---|---|
| H04N 7/18 | (2006.01) |
| G01B 11/03 | (2006.01) |
| G01B 11/02 | (2006.01) |
| G06T 7/60 | (2006.01) |

(52) U.S. Cl.
CPC .............. G01B 11/03 (2013.01); G01B 11/028 (2013.01); G06T 7/602 (2013.01); G06T 2207/20104 (2013.01); G06T 2207/30164 (2013.01)

(58) Field of Classification Search
USPC ...................................................... 348/86, 87
See application file for complete search history.

(56) References Cited

U.S. PATENT DOCUMENTS

| | | | |
|---|---|---|---|
| 5,018,219 A * | 5/1991 | Matsuzaki et al. ............ | 382/226 |
| 5,528,387 A * | 6/1996 | Kelly et al. ................... | 358/488 |
| 2005/0140664 A1 | 6/2005 | Kawamura et al. | |

FOREIGN PATENT DOCUMENTS

| | | |
|---|---|---|
| CN | 1653810 A | 8/2005 |
| CN | 101196389 A | 6/2008 |
| DE | 41 35 881 A1 | 5/1993 |
| DE | 199 14 862 A1 | 10/2000 |
| DE | 10 2006 048 236 A1 | 5/2007 |
| EP | 1 534 007 A1 | 5/2005 |
| JP | A-08-247719 | 9/1996 |

OTHER PUBLICATIONS

German Office Action issued in German Patent Application No. 10 2011 110 956.4 dated Mar. 12, 2013 (w/translation).

* cited by examiner

Primary Examiner — Geepy Pe
(74) Attorney, Agent, or Firm — Oliff PLC

(57) ABSTRACT

Disclosed is an image measuring apparatus including an image capture unit which captures an image of a measurement subject, an import unit which imports the image of the measurement subject which is captured by the image capture unit, a binarization unit which binarizes the image which is imported by the import unit, a contour detection unit which recognizes graphic information in the image which is binarized by the binarization unit and detects a contour of the graphic information, a corner detection unit which detects corners of the graphic information based on the contour which is detected by the contour detection unit, a setting unit which respectively sets edge detection tools on lines of the contour including the corners detected by the corner detection unit and a measurement unit which measures the graphic information by the edge detection tools which are set by the setting unit.

12 Claims, 12 Drawing Sheets

BACKGROUND INFORMATION

GRAPHIC INFORMATION

GRAPHIC TARGETED
FOR MEASUREMENT

IMAGE MEASURING APPARATUS AND IMAGE MEASURING METHOD

BACKGROUND OF THE INVENTION

1. Field of the Invention

The present invention relates to an image measuring apparatus and an image measuring method.

2. Description of Related Art

Conventionally, there is known an image measuring apparatus which captures an image of a measurement location of a work piece by a CCD (Charge Coupled Device) camera or the like and performs edge detection, pattern matching and the like in the captured image (for example, see JP H8-247719).

Edge detection is a technique to determine whether the work piece is the desired work piece or not and the like by obtaining edge information (position coordinate and the like) of a measurement target graphic included in a captured image based on edge detection tools T set by an operator as shown in FIG. 11 and by measuring the position, width, height and the like of the measurement target graphic as shown in FIG. 12, for example.

Moreover, pattern matching is a technique to determine whether the work piece is the desired work piece or not and the like by measuring position aberration, angle aberration and the like, for example, of the work piece by comparing the measurement target graphic included in the captured image to a template image which is registered in advance.

However, the conventional image measuring apparatus is troublesome because the edge detection tool T needs to be set to a plurality of locations manually by an operator to carry out edge detection.

Further, the conventional image measuring apparatus is troublesome to carry out pattern matching because a template image needs to be registered according to the shape of the measurement target graphic. Furthermore, when the direction, size and the like of the measurement target graphic are different from those of the template image, there are inconveniences such that the processing needs more time and that the pattern matching cannot be performed.

SUMMARY OF THE INVENTION

It is, therefore, a main object of the present invention is to provide an image measuring apparatus and an image measuring method which are not troublesome to an operator and in which measurement can be performed promptly and surely.

To achieve at least one of the above objects, an image measuring apparatus reflecting one aspect of the present invention includes an image capture unit which picks up an image of a measurement subject, an import unit which imports the image of the measurement subject which is captured by the image capture unit, a binarization unit which binarizes the image which is imported by the import unit, a contour detection unit which recognizes graphic information in the image which is binarized by the binarization unit and detects a contour of the graphic information, a corner detection unit which detects corners of the graphic information based on the contour which is detected by the contour detection unit, a setting unit which respectively sets edge detection tools on lines of the contour including the corners detected by the corner detection unit and a measurement unit which measures the graphic information by the edge detection tools which are set by the setting unit.

Further, to achieve at least one of the above objects, an image measuring method performed by the image measuring apparatus reflects one aspect of the present invention includes importing the image of the measurement subject which is captured by the image capture unit, binarizing the image which is imported by the import unit, recognizing graphic information in the image which is binarized by the binarization unit, detecting a contour of the graphic information, detecting corners of the graphic information based on the contour which is detected by the contour detection unit, setting edge detection tools on lines of the contour including the corners detected by the corner detection unit and measuring the graphic information by the edge detection tools which are set by the setting unit.

BRIEF DESCRIPTION OF THE DRAWINGS

The above and other objects, advantages and features of the present invention will become more fully understood from the detailed description given hereinbelow and the appended drawings which are given byway of illustration only, and thus are not intended as a definition of the limits of the present invention, and wherein.

DESCRIPTION OF THE PREFERRED EMBODIMENTS

Hereinafter, an image measuring apparatus according to the present invention will be described in detail with reference to the drawings.

The image measuring apparatus 100 is an apparatus which captures an image of a work piece (measurement subject) 12 which is placed on a measuring table 13 and detects edges of a predetermined graphic (graphic information) in the image by processing the image to measure values such as line width and the like of the graphic information.

Figure 1:
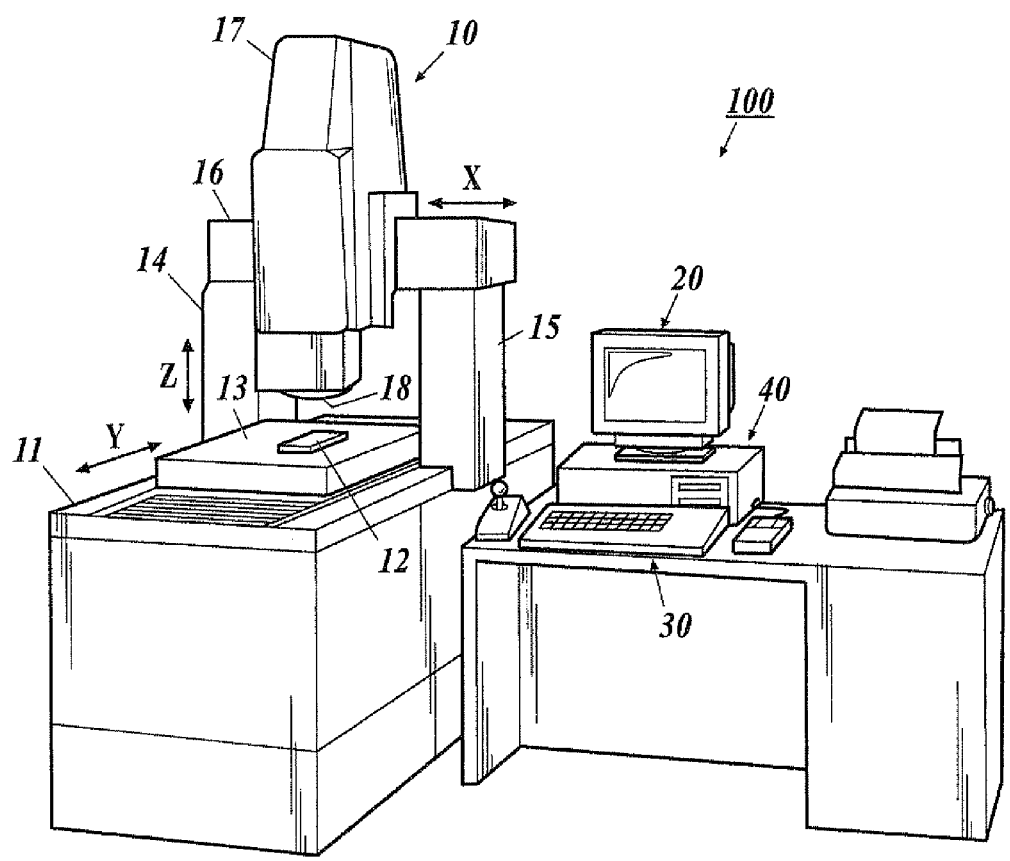
FIG. 1 is an outer view showing an entire structure of an image measuring apparatus according to the present invention.
Figure 2:
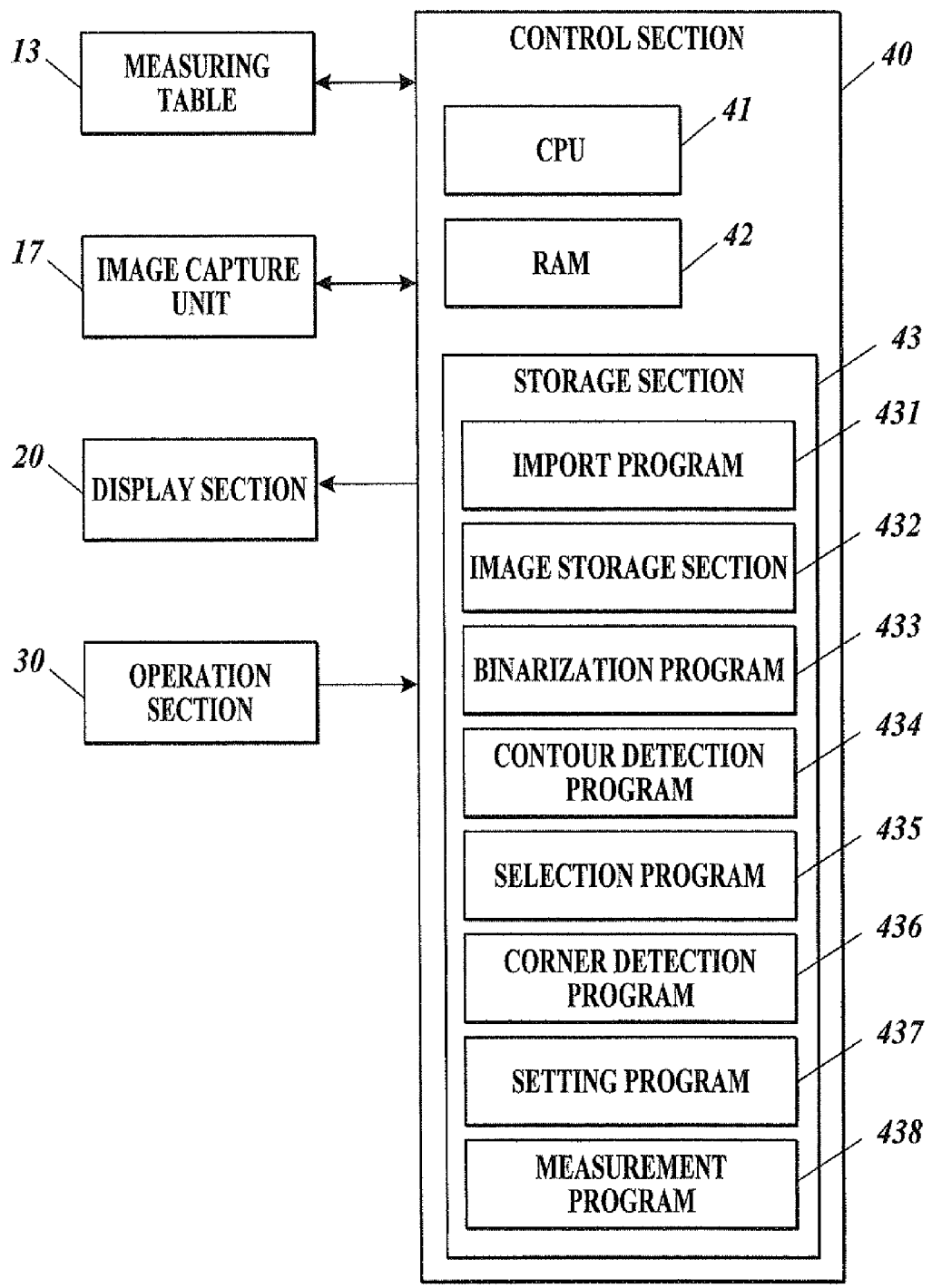
FIG. 2 is a block diagram showing a control structure of the image measuring apparatus of FIG. 1.

As shown in FIGS. 1 and 2, the image measuring apparatus 100 includes an apparatus main body 10, a display section 20, an operation section 30, a control section 40 and the like.

The apparatus main body 10 includes a measuring table 13 for placing a work piece 12, an image capture unit 17 to capture an image of the work piece 12 and the like.

The measuring table 13 is mounted on a counter 11 and is driven in Y-axis direction by a Y-axis driving mechanism (not shown in the drawing). At the center portions of the edges of the counter 11, supporting arms 14 and 15 which extend upward are respectively fixed, and a X-axis guide 16 is fixed so as to joint the upper end portions of the supporting arms 14 and 15. The image capture unit 17 is supported by the X-axis guide 16.

The image capture unit 17 is driven along the X-axis guide 16 by the X-axis driving mechanism (not shown in the drawing). At the lower end portion of the image capture unit 17, a CCD camera 18 is mounted so as to face the measuring table 13.

Moreover, in the image capture unit 17, a Z-axis driving mechanism which moves the position of the CCD camera 18 in the Z-axis direction is embedded in addition to a lighting device and a focusing mechanism which are not shown in the drawing.

The display section 20 includes a liquid crystal display panel, for example, and displays various types of images and setting screens according to a control signal inputted from the control section 40.

In particular, for example, the image which is captured and imported by the image capture unit 17 (original image: see FIG. 3), transition images of while going through procedures of image measuring process (FIGS. 4 to 8) and the like are displayed in the display section 20.

Here, original image will be described.

Original image is a black and white grayscale image including one or a plurality of graphic information.

Figure 3:
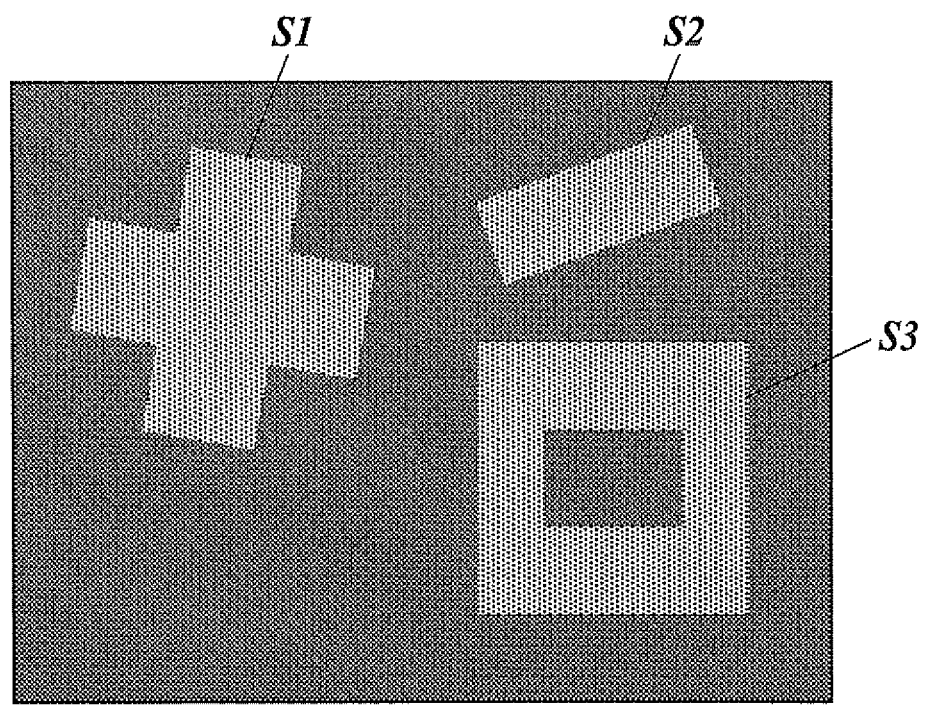
FIG. 3 is an example of an original image which is to be imported by the image measuring apparatus of FIG. 1.

Graphic information is an area in an original image which is to be a target for measurement, and as shown in FIG. 3, graphic information is in polygonal shapes such as quadrangle (square, rectangle), dodecagon (cross-like figure) and the like, for example, and is shown as white portions in the original image.

Further, in an original image, area other than graphic information is background information which becomes the background of the graphic information and is indicated as black portion in which black is denser than in the graphic information.

FIG. 3 is an example of an original image including the graphic information S1 in dodecagon, the graphic information S2 in quadrangle and the graphic information S3 in quadrangle in which middle portion is cut out.

The operation section 30 includes a group of operation keys such as a key board, a pointing device such as a mouse and the like, for example, and when the operation section 30 is operated by an operator, the operation section 30 outputs an operation signal according to the operation to the control section 40.

The operation section 30 is used as a specifying unit when specifying the shape of graphic information which is to be measured in the graphic information in the original image.

In particular, an operator specifies the shape of graphic information which is to be measured by specifying the number of corners by the operation section 30 by using the setting screen displayed in the display section 20.

For example, when an operator specifies "4", quadrangle (square, rectangle) graphic information is selected in the graphic information in the original image, and the graphic information other than the quadrangle graphic information such as a dodecagon (graphic information of a cross-like figure) is not selected.

In such way, when an operator specifies the number of corners by the operation section 30, edge detection is performed by selecting the graphic information having the number of corners which is specified in the graphic information in the original image.

Therefore, an operator can arbitrarily specify the graphic information to which edge detection is to be performed. That is, when a plurality of graphic information in different shapes exist in the imported original image, an operator can measure only the graphic information in desired shape by specifying the shape of graphic information by the operation section 30.

Moreover, the operation section 30 is operated when carrying out the image capture instruction operation of a work piece and the starting instruction operation of the image measuring process and the like.

The control section 40 includes a CPU (Central Processing Unit) 41, a RAM (Random Access Memory) 42, a storage section 43 and the like. Further, the control section 40 is connected with the measuring table 13, the image capture unit 17, the display section 20, the operation section 30 and the like via a system bus.

For example, the CPU 41 performs various types of control processes in compliance with various types of processing programs for the image measuring device which are stored in the storage section 43.

For example, the RAM 42 includes a program storage area for developing the processing programs and the like which are executed by the CPU 41 and a data storage area for storing input data and processing results and the like generated when executing the processing programs.

For example, the storage section 43 stores a system program which can be executed by the image measuring apparatus 100, various types of process programs which can be executed by the system program, data which is used when executing the various types of process programs, data of various types of processing results to which arithmetic processing is performed by the CPU 41 and the like. Here, the programs are stored in the storage section 43 in a format of program codes which can be handled by a computer.

In particular, an import program 431, an image storage section 432, a binarization program 433, a contour detection program 434, a selection program 435, a corner detection program 436, a setting program 437, a measurement program 438 and the like are stored in the storage section 43, for example.

For example, the import program 431 is a program to make the CPU 41 realize a function of importing an image of the work piece 12 which is captured by the image capture unit 17.

In particular, when an image of the work piece 12 is captured by the CCD camera 18 of the image capture unit 17 by an operator carrying out the image capture instruction operation of the work piece by the operation section 30, the CPU 41 executes the import program 431 to import the original image as shown in FIG. 3 and store the original image in the image storage section 432.

By executing the import program 431, the CPU 41 functions as the import unit.

The image storage section 432 stores the original image (black and white grayscale image) which is imported by the CPU 41 executing the import program 431.

The binarization program 433 is a program to make the CPU 41 realize a function of binarizing the image which is imported by the execution of the import program 431, for example.

In particular, when an operator performs the starting instruction operation of image measuring process by the operation section 30, the CPU 41 executes the binarization program 433 and converts the original image which is black and white grayscale image into a two tone image of black and white.

That is, for example, the CPU 41 sets a certain threshold value, and with respect to each of the pixels, the CPU 41 converts the pixel into white when the gray value (brightness) of the pixel exceeds the threshold value and the CPU 41 converts the pixel into black when the gray value (brightness) of the pixel is lower than the threshold value. In such way, the original image becomes a binarized image in which the black part of the binarization is blacker than that part of the original image and the white part of the binarization is whiter than that part of the original image.

Figure 4:
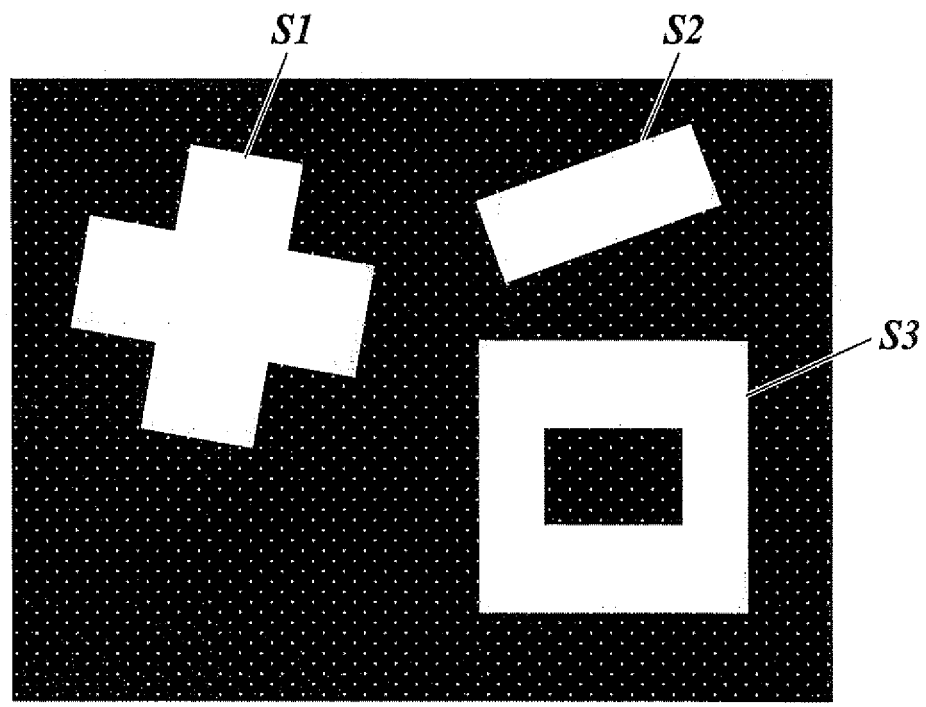
FIG. 4 is an example of a binarized image wherein the original image is binarized.

Therefore, as shown in FIG. 4, the graphic information S1 to S3 which are white parts are vivid with respect to the background which is black part.

By executing the binarization program 433, the CPU 41 functions as the binarization unit.

The contour detection program 434 is a program to make the CPU 41 realize a function of recognizing graphic information in the image which is binarized by the execution of binarization program 433 and detecting the contour of the graphic information, for example.

Figure 5:
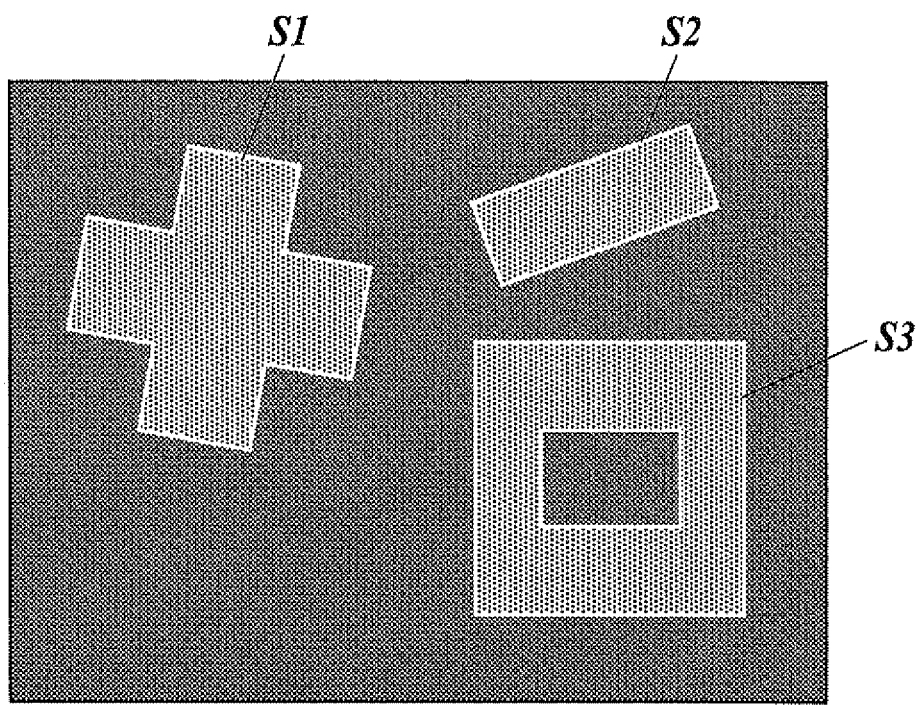
FIG. 5 is an example of an image wherein the contour is detected in the binarized image.

In particular, by executing the contour detection program 434, the CPU 41 recognizes the white parts of the binarized image as graphic information and displays the contour of the recognized graphic information in white lines as shown in FIG. 5.

Therefore, as shown in FIG. 5, the graphic information S1 is displayed as a dodecagon (cross-like figure) in white lines and the graphic information S2 is displayed as a quadrangle in white lines. Further, the graphic information S3 is displayed as a large quadrangle and a small quadrangle in white lines.

By executing the contour detection program 434, the CPU 41 functions as the contour detection unit.

The selection program 435 is a program to make the CPU 41 realize a function of selecting the graphic information in the shape specified by the operation section 30 among the graphic information in which the contours are detected by the execution of the contour detection program 434, for example.

For example, when an operator specifies "4" by the operation section 30, the graphic information S2 and the graphic information S3 are selected among the graphic information S1 to S3 in the example of FIG. 5.

By executing the selection program 435, the CPU 41 functions as the selection unit.

The corner detection program 436 is a program to make the CPU 41 realize a function of detecting corners of the graphic information which is selected by the execution of the selection program 435 based on the contours which are detected by the execution of the contour detection program 434, for example.

In particular, the CPU 41 approximates the lines of the contour of graphic information in the shape specified by the operation section 30 and displays the end points of the approximate straight lines by indicating them with white circles as corners.

Figure 6:
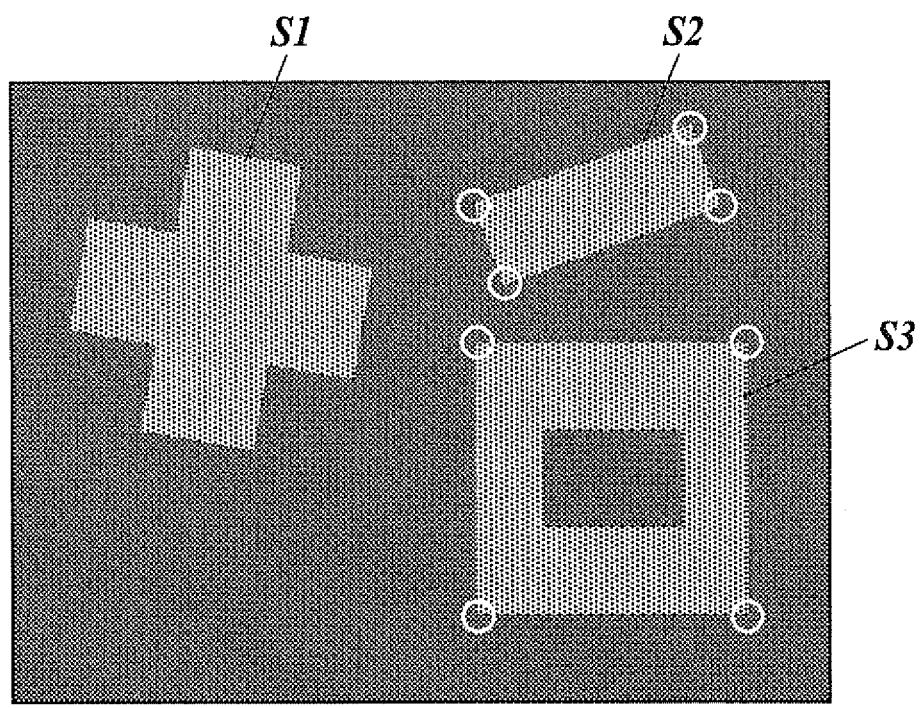
FIG. 6 is an example of an image wherein corners are detected in graphic information.

For example, when quadrangle shape is specified, the white circles are to be displayed at total of eight points which are four points in the quadrangle of the graphic information S2 and four points in the large-and-small quadrangles of the graphic information S3 as shown in FIG. 6.

By executing the corner detection program 436, the CPU 41 functions as the corner detection unit.

The setting program 437 is a program to make the CPU 41 realize a function of setting edge detection tools T on the contour including the corners which are detected by the execution of the corner detection program 436.

In particular, the CPU 41 obtains positions which are centers of the approximate straight lines from the position coordinates of both end points of each of the approximate straight lines and sets edge detection tools T so that the centers of the detection tools T (box tools) respectively overlap the centers of the approximate straight lines.

Figure 7:
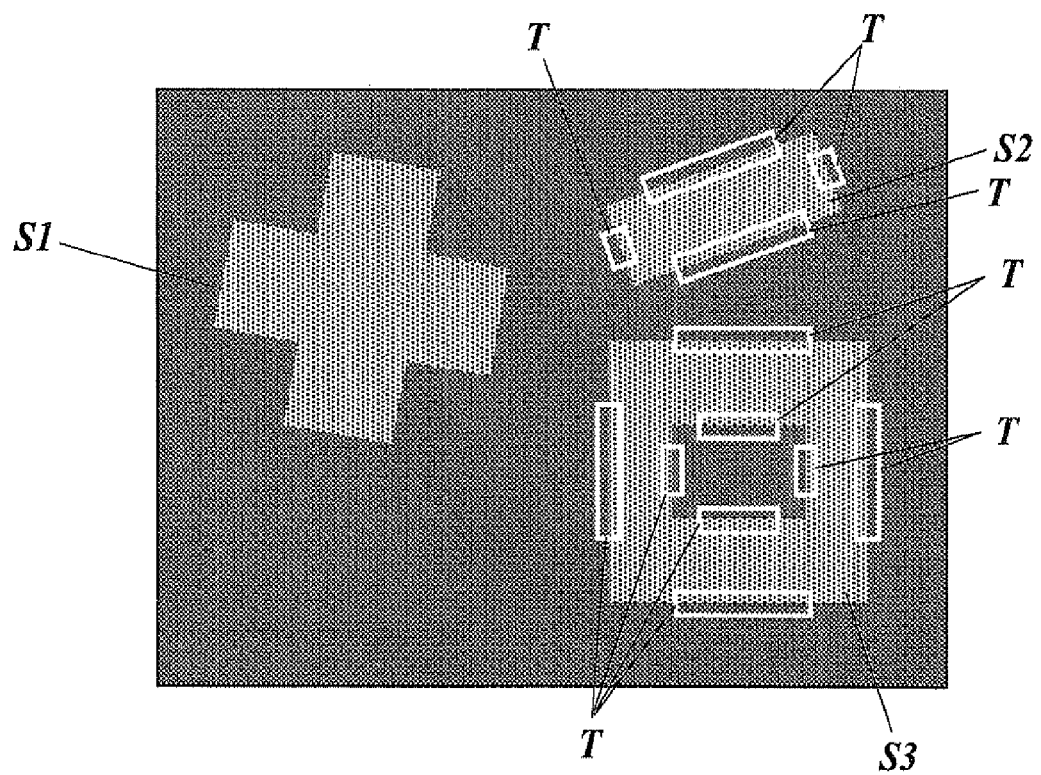
FIG. 7 is an example of an image in which edge detection tools are set.

Therefore, for example, when the corners of the graphic information S2 and S3 of quadrangles are detected as shown in FIG. 6, the edge detection tools T are respectively set at the centers of four sides of the graphic information S2 and the edge detection tools T are respectively set at the centers of four sides of the large-and-small quadrangles of the graphic information S3 as shown in FIG. 7.

By executing the setting program 437, the CPU 41 functions as the setting unit.

The measurement program 438 is a program to make the CPU 41 realize a function of measuring the graphic information by the edge detection tools T which are set by the execution of the setting program 437.

In particular, the CPU 41 scans within the image and detects the positions of edges based on the edge detection tools T. Then, the CPU 41 measures between the edge position which is detected by one edge detection tool T and the edge position which is detected by an edge detection tool T which faces the one edge detection tool T to obtain the width and height of the polygonal shape.

Figure 8:
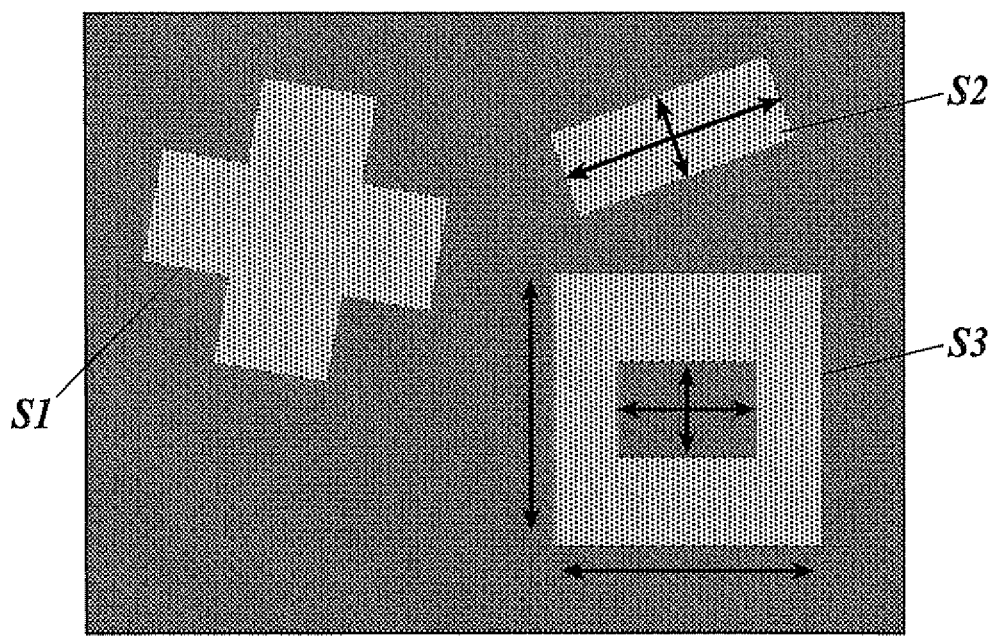
FIG. 8 is a diagram showing measurement locations in the graphic information to be measured by the set edge detection tools.

In such way, for example, horizontal and vertical size of the graphic information S2, horizontal and vertical size of the graphic information S2, the size of the cut out portion of the graphic information S3 can be obtained as shown in FIG. 8.

By executing the measurement program 438, the CPU 41 functions as the measurement unit.

Figure 9:
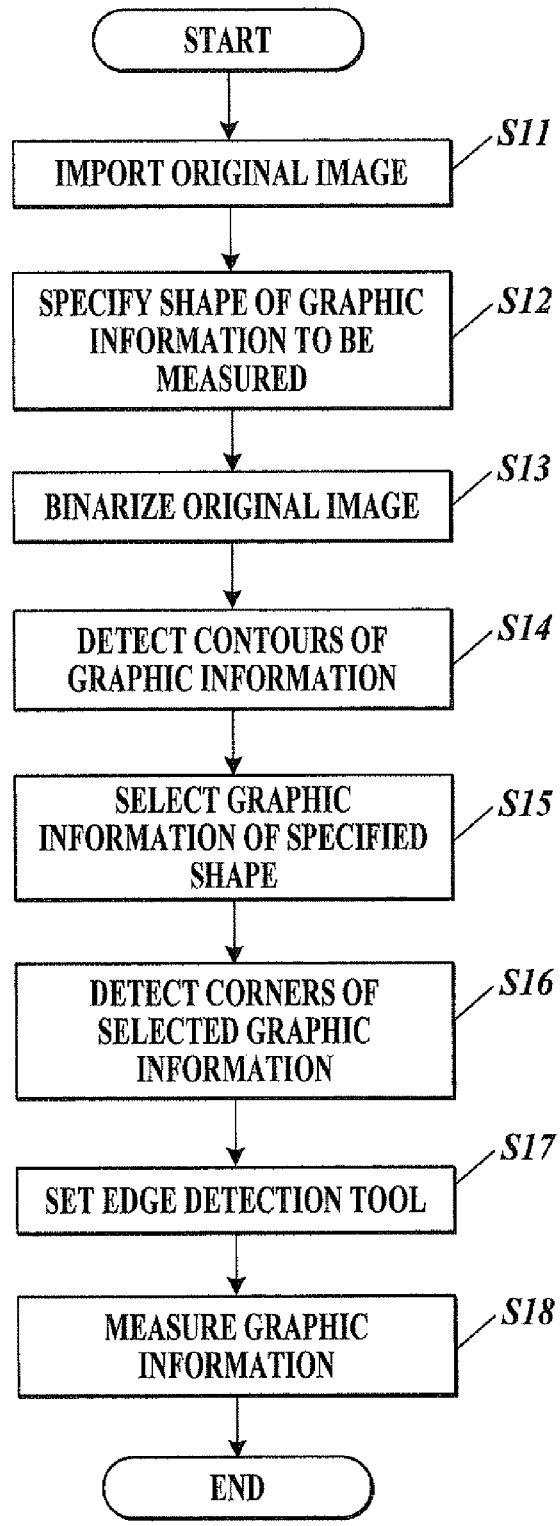
FIG. 9 is a flowchart showing an image measuring process according to the present invention.

Next, the image measuring process of the image measuring apparatus 100 will be described by using the flowchart of FIG. 9.

First, in step S11, when an operator performs the image capture instruction operation of a work piece and an image of the work piece 12 is captured by the image capture unit 17, the CPU 41 imports the image of the work piece 12 which is captured as the original image (see FIG. 3) (import process).

Next, in step S12, the starting instruction operation of the image measuring process is performed by the shape of the graphic information which is to be measured being specified by an operator specifying the number of corners by the operation section 30.

Thereafter, in step S13, the CPU 41 binarizes the original image (see FIG. 4) (binarization process).

Next, in step S14, the CPU 41 recognizes the graphic information in the binarized image and detects the contours of the graphic information (see FIG. 5) (contour detection process).

Next, in step S15, the CPU 41 selects the graphic information including the number of corners specified in step S12 among the graphic information in which the contours are detected, that is, the CPU 41 selects the graphic information of the specified shape (selection process).

Next, in step S16, the CPU 41 detects the corners of the selected graphic information (see FIG. 6) (corner detection process).

Thereafter, in step S17, the CPU 41 respectively sets the edge detection tools T on lines of the contour including corners (see FIG. 7) (setting process).

Next, in step S18, the CPU 41 measures the graphic information by the edge detection tools T (see FIG. 8) (measuring process), and the process is ended.

As described above, according to the image measuring apparatus 100 and the image measuring method of the embodiment, the CPU 41 imports and binarizes an image of the work piece 12 which is captured by the image capture unit 17, recognizes graphic information in the binarized image and detects the contours of the graphic information. Further, the CPU 41 detects corners of the graphic information based on the detected contours, respectively sets edge detection tools T on the lines of the contours including the corners and measures the graphic information by the edge detection tools T.

Therefore, an operator does not need to set the edge detection tools manually because the contour and corners of the graphic information are detected and the edge detection tools T are set automatically.

Moreover, a template image for comparison does not need to be registered because the graphic information which is the target for measurement is recognized by the black and white of the binarized image.

Further, the edge detection tools can be set regardless of the condition, such as direction and size, of the graphic information which is the target for measurement because lines of the contour of the graphic information which is to be the target for measurement are approximated to straight lines and the endpoints of the straight lines set as corners and the edge detection tools are respectively set on the lines of the contour including the corners.

Therefore, it is not troublesome for the operator and the measurement can be performed promptly and surely. Thus, the usability of the image measuring apparatus is improved.

Moreover, according to the image measuring apparatus 100 and the image measuring method of the embodiment, the measurement subject which is polygonal shape can be measured preferably because the graphic information is polygonal.

Further, according to the image measuring apparatus 100 and the image measuring method of the embodiment, the CPU 41 selects the graphic information in the shape specified by the operation section 30 among the graphic information in which the contours are detected and the CPU 41 detects the corners of the selected graphic information.

Therefore, measurement can be performed efficiently because only the graphic information intended by an operator is selected and the edge detection is performed.

Here, in the above embodiment, the case where an operator specifies the shape of the graphic information which is to be measured and only the graphic information of the specified shape is selectively measured is described as an example. However, the shape of the graphic to be measured may be not specified.

In such case, an operator does not specify the shape of the graphic information which is to be measured and performs the starting instruction operation of the image measuring process. Further, when the contour of the graphic information is detected, the CPU 41 detects corners of the graphic information based on all of the contours which are detected. That is, even when a plurality of graphic information in different shapes are mixed in the original image, all of the graphic information are to be measured.

Figure 10:
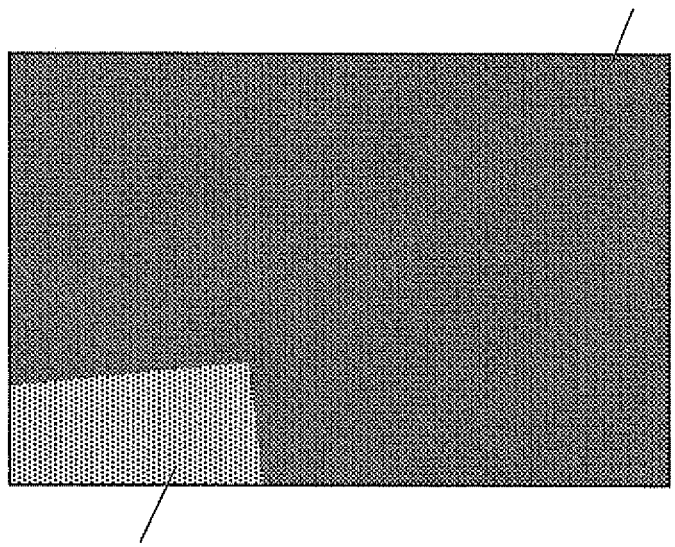
FIG. 10 is a diagram showing a modification of graphic information.
Figure 11:
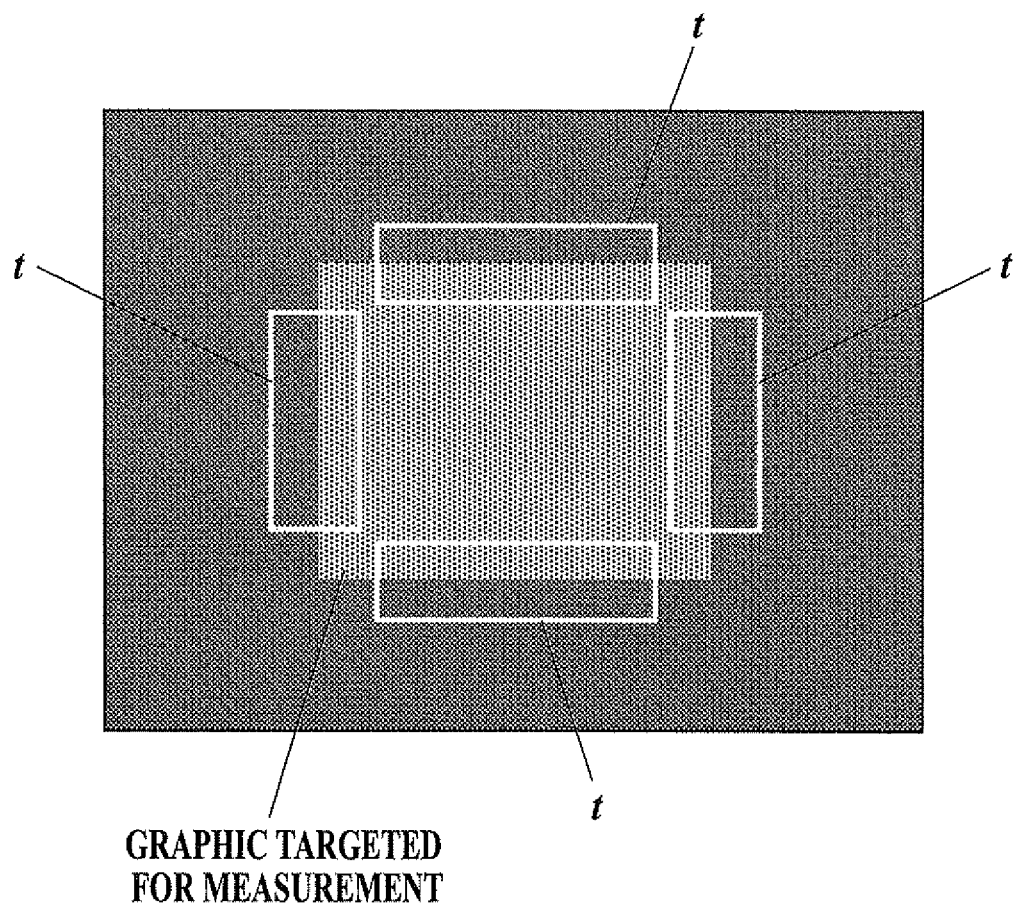
FIG. 11 is a diagram for explaining the conventional technique.
Figure 12:
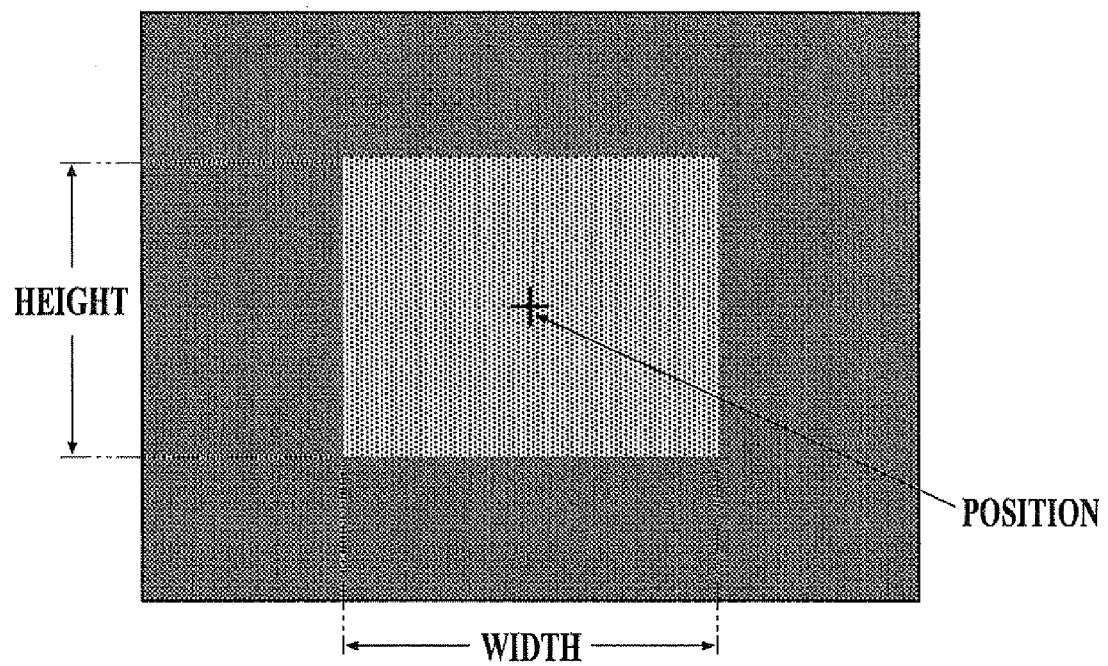
FIG. 12 is a diagram for explaining the conventional technique.

Moreover, for example, the graphic information which is targeted for measurement may be a part of graphic information of a polygonal shape as shown in FIG. 10. Even in such case, measurement of edge positions and the like can be performed because the edge detection tools T are to be set on the contour including corners.

According to a first aspect of the preferred embodiment of the present invention, an image measuring apparatus includes an image capture unit which picks up an image of a measurement subject, an import unit which imports the image of the measurement subject which is captured by the image capture unit, a binarization unit which binarizes the image which is imported by the import unit, a contour detection unit which recognizes graphic information in the image which is binarized by the binarization unit and detects a contour of the graphic information, a corner detection unit which detects corners of the graphic information based on the contour which is detected by the contour detection unit, a setting unit which respectively sets edge detection tools on lines of the contour including the corners detected by the corner detection unit and a measurement unit which measures the graphic information by the edge detection tools which are set by the setting unit.

Preferably, the graphic information is polygonal shape.

Preferably, the image measuring apparatus further includes a specifying unit which specifies a shape of the graphic information to be measured and a selection unit which selects graphic information in the shape specified by the specifying unit among the graphic information in which the contour is detected by the contour detection unit, and the corner detection unit detects corners of the graphic information selected by the selection unit based on the contour detected by the contour detection unit.

According to a second aspect of the preferred embodiment of the present invention an image measuring method performed by the image measuring apparatus includes importing the image of the measurement subject which is captured by the image capture unit, binarizing the image which is imported by the import unit, recognizing graphic information in the image which is binarized by the binarization unit, detecting a contour of the graphic information, detecting corners of the graphic information based on the contour which is detected by the contour detection unit, setting edge detection tools on lines of the contour including the corners detected by the corner detection unit and measuring the graphic information by the edge detection tools which are set by the setting unit.

Preferably, the graphic information is polygonal shape.

Preferably, the image measuring method further includes selecting graphic information in the shape specified by the specifying unit among the graphic information in which the contour is detected in the detecting of contour, and corners of the graphic information selected in the selecting based on the contour detected in the detecting of contour are detected in the detecting of corners.

The present U.S. patent application claims a priority under the Paris Convention of Japanese patent application No. 2010-183566 filed on Aug. 19, 2010, which shall be a basis of correction of an incorrect translation.

Although various exemplary embodiments have been shown and described, the invention is not limited to the embodiments shown. Therefore, the scope of the invention is intended to be limited solely by the scope of the claims that follow.

What is claimed:
1. An image measuring apparatus, comprising:
   an image capture unit which captures an image of a measurement subject;
   an import unit which imports the image of the measurement subject which is captured by the image capture unit;
   a binarization unit which binarizes the image which is imported by the import unit;

a contour detection unit which recognizes graphic information in the image which is binarized by the binarization unit and detects a contour of the graphic information;

a corner detection unit which detects corners of the graphic information based on the contour which is detected by the contour detection unit;

a setting unit which respectively sets edge detection tools on lines of the contour including the corners detected by the corner detection unit; and a measurement unit which measures the graphic information by the edge detection tools which are set by the setting unit, wherein the setting unit sets the edge detection tools so that a longitudinal center axis of the detection tool respectively substantially overlaps a center portion of a line between adjacent corners detected by the corner detection unit, a length of the center portion corresponding to a length of the respective edge detection tool.

2. The image measuring apparatus according to claim 1, wherein the graphic information is a polygonal shape.

3. The image measuring apparatus according to claim 1, further comprising:

a specifying unit which specifies a shape of the graphic information to be measured; and a selection unit which selects graphic information in the shape specified by the specifying unit among the graphic information in which the contour is detected by the contour detection unit, wherein the corner detection unit detects corners of the graphic information selected by the selection unit based on the contour detected by the contour detection unit.

4. An image measuring method performed by an image measuring apparatus, comprising:

importing by an import unit an image of a measurement subject which is captured by an image capture unit;

binarizing the image by a binarization unit;

recognizing graphic information in the image which is binarized by the binarization unit;

detecting a contour of the graphic information by a contour detection unit;

detecting corners of the graphic information based on the contour which is detected by the contour detection unit;

setting by a setting unit edge detection tools on lines of the contour including the corners detected by the corner detection unit; and measuring the graphic information by the edge detection tools which are set by the setting unit, wherein the setting unit sets the edge detection tools so that a longitudinal center axis of the detection tool respectively substantially overlaps a center portion of a line between adjacent corners detected by the corner detection unit, a length of the center portion corresponding to a length of the respective edge detection tool.

5. The image measuring method according to claim 4, wherein the graphic information is a polygonal shape.

6. The image measuring method according to claim 4, further comprising:

selecting graphic information in a shape specified by a specifying unit among the graphic information in which the contour is detected in the detecting of contour, wherein corners of the graphic information selected in the selecting based on the contour detected in the detecting of contour are detected in the detecting of corners.

7. The image measuring apparatus according to claim 1, wherein the setting unit automatically sets edge detection tools on the lines of the contour.

8. The image measuring method according to claim 4, wherein the setting unit automatically sets edge detection tools on the lines of the contour.

9. The image measuring apparatus according to claim 1, wherein the edge detection tools automatically detect positions of respective edges of the graphic information.

10. The image measuring method according to claim 4, wherein the edge detection tools automatically detect positions of respective edges of the graphic information.

11. The image measuring apparatus according to claim 1, wherein the setting unit sets edge detection tools to overlap a center of the lines of the contour between detected corners.

12. The image measuring method according to claim 4, wherein the setting unit sets edge detection tools to overlap a center of the lines of the contour between detected corners.

* * * * *